Jan. 12, 1926.                                         1,569,123
                     B. HAMBLET
   AUTOMOBILE STEERING WHEEL AND ELECTRIC HEADLIGHT SWITCH
                   Filed Nov. 9, 1923
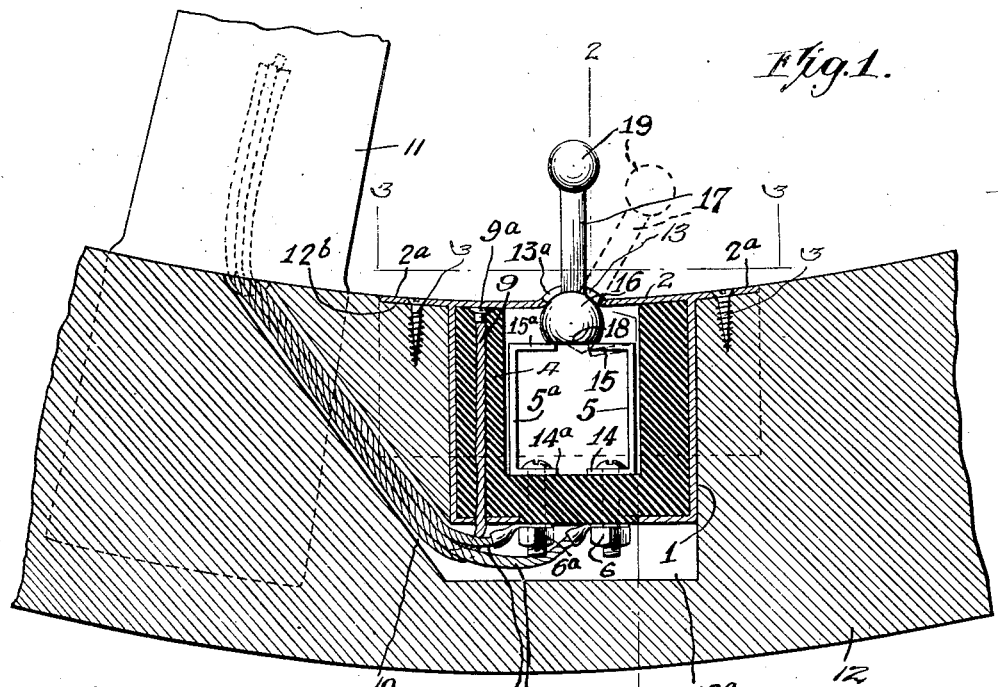
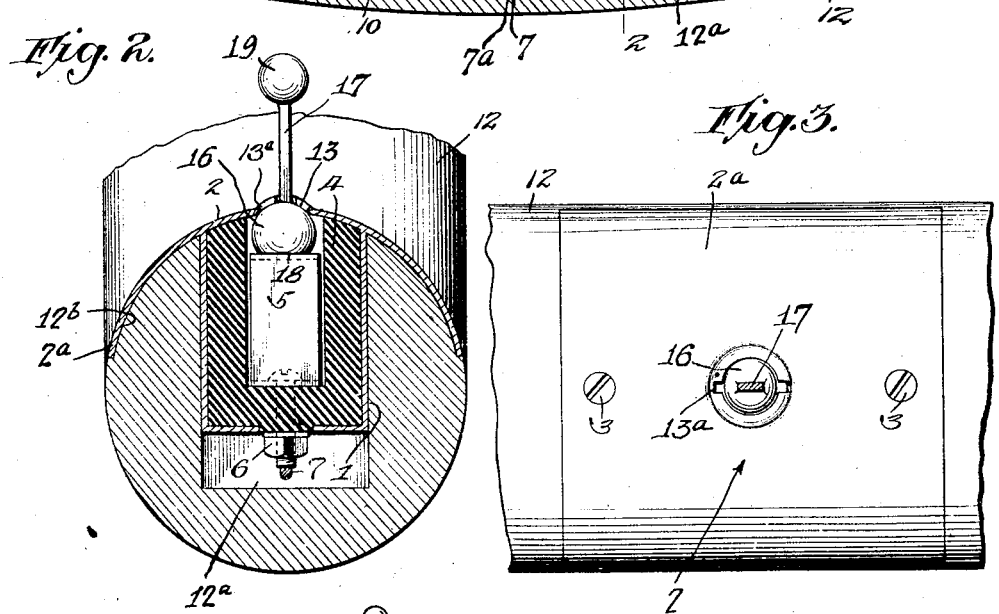
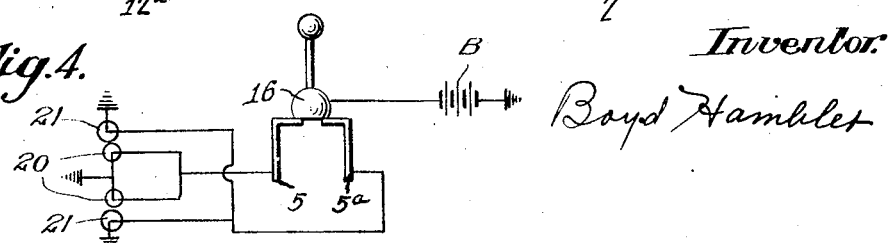
Inventor:
Boyd Hamblet Patented Jan. 12, 1926.

1,569,123

UNITED STATES PATENT OFFICE.

BOYD HAMBLET, OF FLORENCE, COLORADO.

AUTOMOBILE STEERING WHEEL AND ELECTRIC HEADLIGHT SWITCH.

Application filed November 9, 1923. Serial No. 673,719½.

*To all whom it may concern:*

Be it known that I, BOYD HAMBLET, a citizen of the United States, residing at Florence, in the county of Freemont and State of Colorado, have invented certain new and useful Improvements in Automobile Steering Wheels and Electric Headlight Switches, of which the following is a specification, reference being had to the accompanying drawings.

This invention relates to improvements in switches, and more particularly to the construction of a switch for use upon the steering wheels of automobiles which is primarily intended for use in controlling the illumination of the headlights of the automobile.

A further and more specific object of the invention is to provide a cheap, durable and readily installed switch, the casing of which is housed within the steering wheel and which in its operation insures against complete extinguishing of the headlights during change from "dim" to "bright" or "bright" to "dim."

A still further object of the invention is to provide a device of this character in which a rubbing contact is maintained between the blade and contacts of the switch, so that a good contact is assured at all times and so that the parts of the switch will be held in adjusted position by friction, thereby obviating the necessity of employing latching connections between the contacts and main switching element and enabling shifting of the switching element by movement of the thumb or finger so that it is unnecessary to remove the hand from the steering wheel.

Figure 1 is a sectional view through a wheel rim having a switch mounted therein in accordance with my invention.

Figure 2 is a transverse sectional view on the line 2—2 of Figure 1;

Figure 3 is a section on the line 3—3 of Figure 1;

Figure 4 is a diagrammatic view showing one manner of connecting the switch wth the headlight.

Referring now more particularly to the drawings, the numeral 12 indicates the wheel rim of an automobile steering wheel, and 11 the adjacent spoke which, in accordance with my invention, is to be hollow. In the wheel rim, and more particularly in the inner face of the wheel rim, is formed a recess 12ᵃ opening through the inner face of the wheel rim, this recess being connected by a bore or duct 10 with the interior of the hollow spoke 11 of the wheel. Through this hollow spoke and duct to the recess 12ᵃ are directed lead wires 9 and the return wires 7 and 7ᵃ of the switch.

The switch comprises a casing 1 shaped to closely fit within the recess 12ᵃ but to allow between the bottom of the casing and the bottom of the recess sufficient space to accommodate the ends of the lead wires and their connectors as hereinafter described. The outer wall of this casing, indicated at 2, is curved to conform to the curvature of the steering wheel rim, and this outer wall is provided at its side edges with outstanding flanges 2ᵃ which abut the rim about the sides of the recess, the wheel rim being recessed, as at 12ᵇ, so that the outer face of the wall 2 and its flanges 2ᵃ are flush with the inner face of the wheel rim. Arranged within and insulated from the casing, as at 4, are a pair of contacts 5 and 5ᵃ, each substantially C-shape and having their open sides directed toward one another. To these contacts 5 and 5ᵃ the lead wires 7 and 7ᵃ are connected, as by means of terminal bolt 6 and 6ᵃ which extend through the wall of the casing and are insulated therefrom as indicated. These bolts extend through the lower arms 14 and 14ᵃ of the C-shaped contact members, and the upper arms 15 and 15ᵃ thereof are substantially parallel to and spaced from the adjacent face of the outer wall 2 of the casing. Above the space between adjacent ends of the arms 15 and 15ᵃ, the casing wall 2 is formed in its under surface with a concavity 13, which concavity has the same radius as the spherical contact member 16 having a stem 17 which is directed through a slot 13ᵃ formed in the wall 2 at the concavity thereof and extending diametrically of this concavity. The diameter of the spherical contact member 16 is greater than the distance between the under face of the member 2 at the center of this concavity and the adjacent faces of the arms 15 and 15ᵃ of the contact members 5 and 5ᵃ, and this spherical contact member 16 at the opposite side thereof from the stem 17 is flattened, as indicated at 18, this flattening being such that the diameter of the bore is reduced to a point where it is but slightly greater than the normal distance between the face of the concavity at the center thereof and the adjacent faces of the arms, so that these arms are but slightly flexed when the flattened portion of the spherical contact member is in engagement therewith. This flattened portion of the spherical contact member is of sufficient width to bridge the gap between adjacent ends of the arms 15 and 15ª and serves two purposes. When flatly disposed toward these two arms, it connects the two arms with one another and with the casing by its own engagement with the wall 2 of the casing. When it is tilted by means of its stem 17, which is directed through the slot 13ª and is provided with an operating knob 19, the curved wall of the sphere comes in contact with one of the arms 15 or 15ª, depending upon the direction of tilt, and the straight wall thereof is released from the other of the arms breaking the connection between the other of the arms and the casing wall 2. To this casing wall the feed wire 9 is electrically connected, as indicated at 9ª.

In the use of the device the casing is inserted in the opening 12ª as above described and the casing secured in position by means of screws 3 extending into the flanges 2ª, into the rim 12, and then properly connected with the headlights. For the purpose of illustration I have shown in the diagrammatic view of Figure 4 one manner of connecting this switch with the headlight. In this figure the source of current is designated at B. The source of current is connected by the wire 9 with the wall 2 of the casing and may be connected from this wall 2 by the spherical contact member with either of the contact members 5 or 5ª. In the present instance the contact member 5 is shown as connected with the "dim" light 20 of the headlights, while the contact 5ª is shown as connected with the "bright" headlight 21, the circuit to the battery being completed in any desired manner. In the position in which the switch is shown in full lines in Figure 1, both of the contacts 5 and 5ª are electrically connected with the casing and accordingly with the source of power, both illuminating elements 20 and 21 are rendered active. When the switch is moved to the dotted line position, only the dimmer light is illuminated. Particular attention is directed to the fact that in moving to disconnect the dimmer and illuminate the bright lights, both lights are momentarily illuminated and at no time is there a complete disconnection of both lights from the source of power. It will be obvious that a switch of this character may be very cheaply and readily produced, will be durable and efficient in service, and a general improvement in the art.

Since the construction hereinbefore set forth is capable of a certain range of change and modification without materially departing from the spirit of my invention, I do not limit myself to such specific structure except as hereinafter claimed.

I claim:—

1. In a switch of the character described, a casing having formed in the inner face of one wall thereof a concavity, a pair of resilient contacts arranged within the casing opposite to said concavity and extending into proximity to one another, a spherical switching element engaged in said concavity and having a flattened face opposing and engaging said resilient contacts, and means for rotating said spherical switching element upon the diametrical axis thereof lying in a plane bisecting the switching element and extending between adjacent faces of said contacts.

2. In a switch of the character described, a casing having formed in the inner face of one wall thereof a concavity, a pair of resilent contacts arranged within the casing opposite to said concavity and extending into proximity to one another, a spherical switching element engaged in said concavity and having a flattened face opposing and engaging said resilient contacts, and means for rotating said spherical switching element upon the diametrical axis thereof lying in a plan bisecting the switching element and extending between adjacent faces of said contacts, comprising a stem for said switching element directed through a slot formed in said casing wall at the concavity thereof and extending diametrically of such concavity.

3. In a switch of the character described, a casing having formed in the inner face of one wall thereof a concavity, a pair of resilient contacts arranged within the casing opposite to said concavity and extending into proximity to one another, a spherical switching element engaged in said concavity and having a flattened face opposing and engaging said resilient contacts, and means for rotating said spherical switching element upon the diametrical axis thereof lying in a plane bisecting the switching element and extending between adjacent faces of said contacts, comprising a stem for said switching element directed through a slot formed in said casing wall at the concavity thereof and extending diametrically of such concavity, the distance between the under surface of said concavity at either end of said slot and the adjacent end edge of the switch contact lying at the opposite side of the axis of rotation from such slot being greater than the diameter of the switching element perpendicular to such flattened surface.

BOYD HAMBLET.